(12) United States Patent
Miyazawa et al.

(10) Patent No.: US 8,330,977 B2
(45) Date of Patent: Dec. 11, 2012

(54) METHOD OF CREATING DECOMPRESSED DATA

(75) Inventors: Masafumi Miyazawa, Nagoya (JP); Yasuhiro Kudo, Ichinomiya (JP)

(73) Assignee: Brother Kogyo Kabushiki Kaisha, Nagoya-shi, Aichi-Ken (JP)

( * ) Notice: Subject to any disclaimer, the term of this patent is extended or adjusted under 35 U.S.C. 154(b) by 1240 days.

(21) Appl. No.: 12/076,683

(22) Filed: Mar. 21, 2008

(65) Prior Publication Data

US 2008/0239396 A1    Oct. 2, 2008

(30) Foreign Application Priority Data

Mar. 29, 2007   (JP) .................. 2007-089463

(51) Int. Cl.
*G06F 3/12* (2006.01)
*G06K 15/00* (2006.01)

(52) U.S. Cl. .................. 358/1.15; 358/1.16; 358/1.1

(58) Field of Classification Search .................. None
See application file for complete search history.

(56) References Cited

U.S. PATENT DOCUMENTS

| | | | |
|---|---|---|---|
| 5,611,024 A | 3/1997 | Campbell | |
| 6,009,242 A | 12/1999 | Anzai | |
| 7,103,833 B1 | 9/2006 | Sano | |
| 2003/0090397 A1* | 5/2003 | Rasmussen | 341/51 |
| 2006/0268322 A1* | 11/2006 | McGuinness | 358/1.15 |

FOREIGN PATENT DOCUMENTS

| | | |
|---|---|---|
| EP | 1415820 A1 | 5/2004 |
| JP | 11-312069 | 11/1999 |
| JP | 2002-096506 | 4/2002 |
| JP | 2002-276317 | 9/2002 |
| JP | 2005199727 A | 7/2005 |

OTHER PUBLICATIONS

Extended European search report for application No. 08251132.0 mailed Feb. 6, 2012.
Notification of Reasons for Rejection for Japanese patent application No. 2007-089463 mailed Dec. 13, 2011.

* cited by examiner

*Primary Examiner* — Vincent Rudolph
*Assistant Examiner* — Marcus T Riley
(74) *Attorney, Agent, or Firm* — Banner & Witcoff, Ltd.

(57) ABSTRACT

A method may be provided with a first downloading step of downloading a predetermined size of first compressed data of a first image object which is to be included in both a first band of print data and a second band of the print data, a first decompression step of creating first decompressed data by decompressing the first compressed data having the predetermined size downloaded in the first downloading step, a determination step of determining whether all the first decompressed data corresponding to the first band has been created, a repeating step of repeating the first downloading step, the first decompression step, and the determination step in a case where a negative determination is obtained in the determination step, a second downloading step of downloading second compressed data of a second image object in a case where a positive determination is obtained in the determination step, and a second decompression step of creating second decompressed data by decompressing the second compressed data downloaded in the second downloading step.

6 Claims, 15 Drawing Sheets

FIG. 8

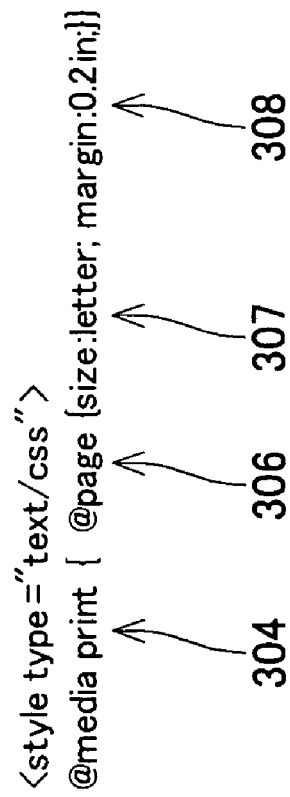

300

```
<?xml version="1.0" encoding="UTF-8"?>
<!DOCTYPE html PUBLIC "-//W3C//DTD XHTML-Print 1.0//EN"
   "http://www.w3.org/MarkUp/DTD/xhtml-print10.dtd">
<html xmlns="http://www.w3.org/1999/xhtml">
<head>
<title>index photo print </title>          ← 302
<base href="http://192.168.0.100/photo/" />

<style type="text/css">
@media print { @page {size:letter; margin:0.2in;}}
```

304 → `<style type...`
306 → `@media print...`
307 → `@page {size:letter;`
308 → `margin:0.2in;}}`

310
 ↓
body { padding:0in; } div.page { position:relative; page-break-after:always; }
  div.page_last { position:relative;}
                 320
                                  322              324              326              328
                                   ↓                ↓                ↓                ↓
315a⎧ div.img1 {overflow:hidden; padding:0in; position:absolute; top:0.0in; left:0.466in; width:3.25in; height:2.5in;}
    ⎜ div.img2 {overflow:hidden; padding:0in; position:absolute; top:0.0in; left:4.382in; width:3.25in; height:2.5in;}
    ⎜ div.img3 {overflow:hidden; padding:0in; position:absolute; top:2.7in; left:0.466in; width:3.25in; height:2.5in;}
315⎨ div.img4 {overflow:hidden; padding:0in; position:absolute; top:2.7in; left:4.382in; width:3.25in; height:2.5in;}
    ⎜ div.img5 {overflow:hidden; padding:0in; position:absolute; top:5.4in; left:0.466in; width:3.25in; height:2.5in;}
    ⎜ div.img6 {overflow:hidden; padding:0in; position:absolute; top:5.4in; left:4.382in; width:3.25in; height:2.5in;}
    ⎜ div.img7 {overflow:hidden; padding:0in; position:absolute; top:8.1in; left:0.466in; width:3.25in; height:2.5in;}
    ⎩ div.img8 {overflow:hidden; padding:0in; position:absolute; top:8.1in; left:4.382in; width:3.25in; height:2.5in;}

/* 2.5 x 3.25 in */
     img.img_23_0deg    { width:3.75in;  height:2.5in; margin-left:  -0.25in; image-orientation:0deg; }
     img.img_23_90deg   { width:3.75in;  height:2.5in; margin-left:  -0.25in; image-orientation:90deg; }
     img.img_23_180deg  { width:3.75in;  height:2.5in; margin-left:  -0.25in; image-orientation:180deg; }
     img.img_23_270deg  { width:3.75in;  height:2.5in; margin-left:  -0.25in; image-orientation:270deg; }

340a⎧ img.img_34_0deg    { width:3.333in; height:2.5in; margin-left: -0.042in; image-orientation:0deg; }
    ⎜ img.img_34_90deg   { width:3.333in; height:2.5in; margin-left: -0.042in; image-orientation:90deg; }
340⎨ img.img_34_180deg  { width:3.333in; height:2.5in; margin-left: -0.042in; image-orientation:180deg; }
    ⎜ img.img_34_270deg  { width:3.333in; height:2.5in; margin-left: -0.042in; image-orientation:270deg; }
    ⎜
    ⎜ img.img_916_0deg   { width:4.444in; height:2.5in; margin-left: -0.597in; image-orientation:0deg; }
    ⎜ img.img_916_90deg  { width:4.444in; height:2.5in; margin-left: -0.597in; image-orientation:90deg; }
    ⎜ img.img_916_180deg { width:4.444in; height:2.5in; margin-left: -0.597in; image-orientation:180deg; }
    ⎩ img.img_916_270deg { width:4.444in; height:2.5in; margin-left: -0.597in; image-orientation:270deg; }
```

FIG. 10

```
<div class="page">
  <div class="img1"><img src="photo001.jpg" class="img_34_0deg" alt="photo"/></div>
  <div class="img2"><img src="photo002.jpg" class="img_34_0deg" alt="photo"/></div>
  <div class="img3"><img src="photo003.jpg" class="img_34_0deg" alt="photo"/></div>
  <div class="img4"><img src="photo004.jpg" class="img_34_0deg" alt="photo"/></div>
  <div class="img5"><img src="photo005.jpg" class="img_34_0deg" alt="photo"/></div>
  <div class="img6"><img src="photo006.jpg" class="img_34_0deg" alt="photo"/></div>
  <div class="img7"><img src="photo007.jpg" class="img_34_0deg" alt="photo"/></div>
  <div class="img8"><img src="photo008.jpg" class="img_34_0deg" alt="photo"/></div>
```

300

352 — photo00X.jpg
354 — img_34_0deg
350a — <div class="page">
350 — div class img1..img8

```
GET /photo/photo001.jpg HTTP/1.1
Host: 192.168.0.100
Accept: text/xml,application/xml,application/xhtml+xml,text/html;q=0.9,text/plain;q=0.8,image/png,*/*;q=0.5
Accept-Language: ja,en-us;q=0.7,en;q=0.3
Accept-Encoding: gzip,deflate
Accept-Charset: Shift_JIS,utf-8;q=0.7,*;q=0.7
Range:bytes=4000-7999       ← 702
Keep-Alive: 300
```

METHOD OF CREATING DECOMPRESSED DATA

CROSS-REFERENCE TO RELATED APPLICATION

This application claims priority to Japanese Patent Application No. 2007-089463, filed on Mar. 29, 2007, the contents of which are hereby incorporated by reference into the present application.

BACKGROUND OF THE INVENTION

1. Field of the Invention

One technology that is disclosed by the present specification relates to technology that will download compressed data of image objects from an external device, and create decompressed data by decompressing the downloaded compressed data in order to create print data.

2. Description of the Related Art (1) There are printers in existence that will download compressed data of an image object from an external device, create decompressed data by decompressing the downloaded compressed data, and convert the created decompressed data into print data. The decompressed data is, for example, bit map data that is expressed by multilayered RGB (e.g., 256 layers). The print data is bitmap data that is expressed by layers that are smaller than the decompressed data. The number of layers of print data will depend upon the specific construction of the printer. In other words, with a printer that uses only the presence and absence of dots to print, the print data will be expressed by 2 layers (e.g., 0 and 1). In contrast, with a printer that uses large dots, medium dots, small dots, and no dots to print, the print data will be expressed by 4 layers (e.g., 0, 1, 2 and 3).

(2) There are printers in existence that create print data in band units. For example, this type of printer is disclosed in Japanese Patent Application Publication No. 2002-96506.

(3) There are printers in existence that can execute so-called index printing. In other words, there are printers in existence that will adjust a plurality of image objects so as to print on one page. For example, this type of printer is disclosed in Japanese Patent Application Publication No. 11-312069.

BRIEF SUMMARY OF THE INVENTION

Methods of downloading a plurality of image objects from an external device may be exemplified as follows: a method of downloading a plurality of image objects in parallel with a plurality of connections (hereinafter referred to as multi-connection); and a method of downloading a plurality of image objects with one connection (hereinafter referred to as single connection). When downloading a plurality of image objects from an external device with the multi-connection, the printer will simultaneously send a plurality of requests to the external device. The external device corresponding to the multi-connection can respond to each request and send compressed data of the image objects.

When downloading image objects with the single connection, a plurality of requests will not be sent simultaneously to an external device, but rather after downloading one image object, the next image object will be downloaded. By downloading the image objects with the single connection, the image objects can be reliably acquired, even from external devices that do not correspond to the multi-connection (external devices that communicate by means of the single connection).

In contrast, when, for example, creating print data in band units for the aforementioned index printing, a plurality of image objects may be included in one band. For example, FIG. 1 shows a situation in which print data to be used for printing on a print medium 100 is divided into a plurality of bands 130, 132, 134. In this example, the print data for each band 130, 132, 134 will be sequentially created. In other words, the print data for the first band 130 will be created and printed, the print data for the next band 132 will be created and printed, and the print data for the next band 134 will be created and printed. As shown in FIG. 1, a plurality of image objects 110, 120 may be included in one band 130. Furthermore, one image object may be arranged across two or more bands. In the example of FIG. 1, the image object 110 has a portion 110a that is included in band 130, and a portion 110b that is included in band 132.

When downloading two image objects 110, 120 with the single connection in order to create print data for the band 130, these two image objects cannot be downloaded simultaneously. In other words, it will be necessary to download the image object 110, and then download the other image object 120. In this example, the method considered is one in which all compressed data that forms the image object 110 is downloaded, and all decompressed data for the image object 110 is created by decompressing this compressed data. However, in this case, the portion 110b of the decompressed data for the image object 110 is data that is not needed to create print data for the band 130. A device that creates decompressed data needs to cache the portion 110b of the decompressed data for the image object 110 until the stage at which print data for the band 132 is created. In other words, a device is needed that will temporarily store the portion 110b in memory while the decompressed data for the image object 120 is created and the print data for the band 130 is created. This situation will put stress on the memory.

The present specification discloses technology for efficiently creating decompressed data in situations in which compressed data for a plurality of image objects is to be downloaded with the single connection and decompressed data is to be created.

Simply put, in the example of FIG. 1, when downloading compressed data for the image object 110, it would appear that the external device should be requested to send only compressed data that corresponds to the portion 110a. However, if one does not try to decompress the compressed data, one will not know which band that decompressed data corresponds to. Because of this, the present specification achieves the efficient creation of decompressed data by using the following method.

One decompressed data creation method disclosed in the present specification will be described with reference to FIG. 2. FIG. 2 shows a situation in which print data to be used for printing on a print medium 200 is divided into a plurality of bands 230, 232, 234. The data of FIG. 2 is simply an illustration. The technological scope of the technology disclosed in the present specification should not be narrowly interpreted by means of the content of FIG. 2 and the following explanation related thereto.

A decompressed data creation method disclosed in the present specification will download compressed data of a plurality of image objects 210, 220 from an external device utilizing a single connection, and create decompressed data by decompressing the downloaded compressed data in order to create print data. The aforementioned external device is not particularly limited, and may be any type of device. For example, the external device may be a personal computer, a server, a digital camera, portable memory, etc. This decompressed data creation method may be comprised of each of the following steps:

(1) A first downloading step that downloads first compressed data 240 of the first image object 210. The first compressed data 240 has a predetermined size. The first image object 210 is to be included in both the first band 230 of the print data, and the second band 232 of the print data which is next to the first band 230.

(2) A first decompression step that creates first decompressed data by decompressing the first compressed data 240 downloaded in the first downloading step.

(3) A determination step that determines whether or not all first decompressed data 210a corresponding to the first band 230 has been created. The aforementioned "all first decompressed data 210a corresponding to the first band 230" means all first decompressed data 210a needed to create print data for the first band 230. For example, a negative determination will occur at this determination step at the stage at which only the first decompressed data of the first compressed data 240 is created. In this case, the next step will be executed.

(4) A repeating step that repeats the first downloading step, the first decompression step, and the determination step when a negative determination is obtained in the determination step. In other words, first compressed data 242 will be downloaded after the first compressed data 240, that data will be decompressed, and the aforementioned determination step will be executed. In this case, because all of the first decompressed data 210a has yet to be created, the aforementioned steps will be executed again. In other words, the first compressed data 244 will be downloaded, that data will be decompressed, and the aforementioned determination step will be executed. This step will also be executed with respect to first compressed data 246 and first compressed data 248. When the first compressed data 248 is decompressed and decompressed data is created, all of the first decompressed data 210a will have been created. In this way, a positive determination will occur in the determination step. In this case, the next step will be executed.

(5) A second downloading step that downloads second compressed data of the second image object 220 in a case where a positive determination was obtained in the determination step. The second image object 220 is to be included in the first band 230. Note that in the second downloading step, second compressed data of the predetermined size noted above may be downloaded, or second compressed data in another unit may be downloaded.

(6) A second decompression step that creates second decompressed data by decompressing the second compressed data downloaded in the second downloading step.

The aforementioned method will download compressed data of the first image object 210 little by little (download in the aforementioned unit of predetermined size), decompress that data, and execute the aforementioned determination step. If a positive determination occurs in the determination step, the downloading of the first image object 210 will stop, and the downloading of the second image object 220 will begin. The result is that only the first decompressed data 210a needed to create print data for the first band 230 will be created. Or, even if decompressed data corresponding to the second band 232 was created (e.g., see reference number 248 of FIG. 2), this will be a negligible amount, and does not mean that all the decompressed data 210b corresponding to the second band 232 will be created. When this decompressed data creation method is used, it will not be necessary to cache all of the decompressed data 210b corresponding to the second band 232 until the stage at which the print data for the second band 232 is to be created. According to this method, decompressed data can be efficiently created in situations in which compressed data of a plurality of image objects is to be downloaded with a single connection and decompressed data is to be created.

BRIEF DESCRIPTION OF THE DRAWINGS

FIG. 8 shows an example of XHTML-Print data.

FIG. 9 shows an example of XHTML-Print data.

FIG. 10 shows an example of XHTML-Print data.

FIG. 14 shows an example of an HTTP request.

DETAILED DESCRIPTION OF THE PREFERRED EMBODIMENT

Figure 3:
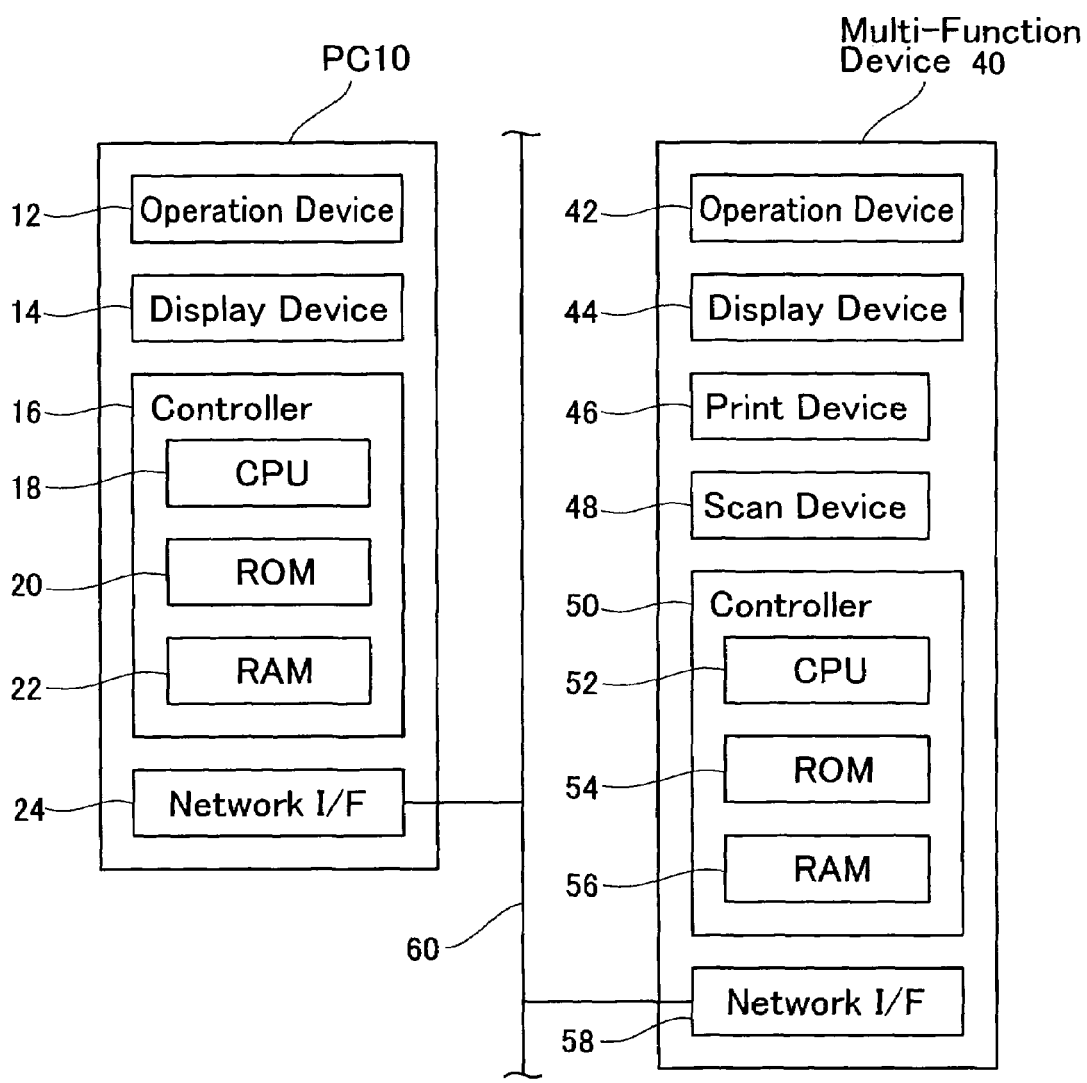
FIG. 3 shows a construction of a multi function device system of an embodiment.

An embodiment will be described with reference to the drawings. FIG. 3 shows a multi-function device system 2 of the present embodiment. The multi-function device system 2 comprises a PC 10 and a multi-function device 40.
(Construction of the PC)

The PC 10 comprises an operation device 12, a display device 14, a controller 16, and a network interface 24. The operating device 12 is constructed from a keyboard and mouse. A user can input various data and commands into the PC 10 by operating the operating device 12. For example, the user can input a print command into the PC 10. The result is that XHTML-Print data described below will be sent to the multi-function device 40 from the PC 10. The display device 14 can display various information.

The controller 16 has a CPU 18, ROM 20, RAM 22, etc. The CPU 18 will execute various processes in accordance with programs stored in ROM 20. The ROM 20 stores various types of programs. For example, ROM 20 stores a program for executing a process that will create XHTML-Print data described below and transmit this data to the multi-function device 40. RAM 22 can temporarily store various information produced during the execution of the processes by the CPU 18. The network interface 24 is connected to a network line 60. The network line 60 is connected to the multi-function device 40. The PC 10 can communicate with the multi-function device 40 via the network interface 24.

(Construction of the Multi-Function Device)

The multi-function device 40 has an operation device 42, a display device 44, a print device 46, a scan device 48, a controller 50, and a network interface 58. The operation device 42 is comprised of a plurality of keys. A user can input various data and commands into the multi-function device 40 by operating the operating device 42. The display device 44 can display various information. The print device 46 of the present embodiment is an ink jet type of print device. The print device 46 can print onto a print medium based upon binary data (print data) described below. The scan device 48 can scan an original document to produce image data.

The controller 50 has a CPU 52, ROM 54, RAM 56, etc. The CPU 52 will execute various processes in accordance with a program stored in ROM 54 The ROM 54 stores various types of programs. For example, ROM 54 stores programs for executing a process that determines the layout of binary data based upon XHTML-Print data, a process that downloads compressed data of an image object, a process that decompresses compressed data and creates decompressed data, a process that converts decompressed data into binary data, etc. RAM 56 can temporarily store various information produced during the execution of the processes by the CPU 56. The content of the information stored in RAM 56 will be described in detail below. The network interface 58 is connected to the network line 60. The network line 60 is connected to the PC 10. The multi-function device 40 can communicate with the PC 10 via the network interface 58.

(Content of the Data Stored By the Multi-Function Device)

Figure 4:
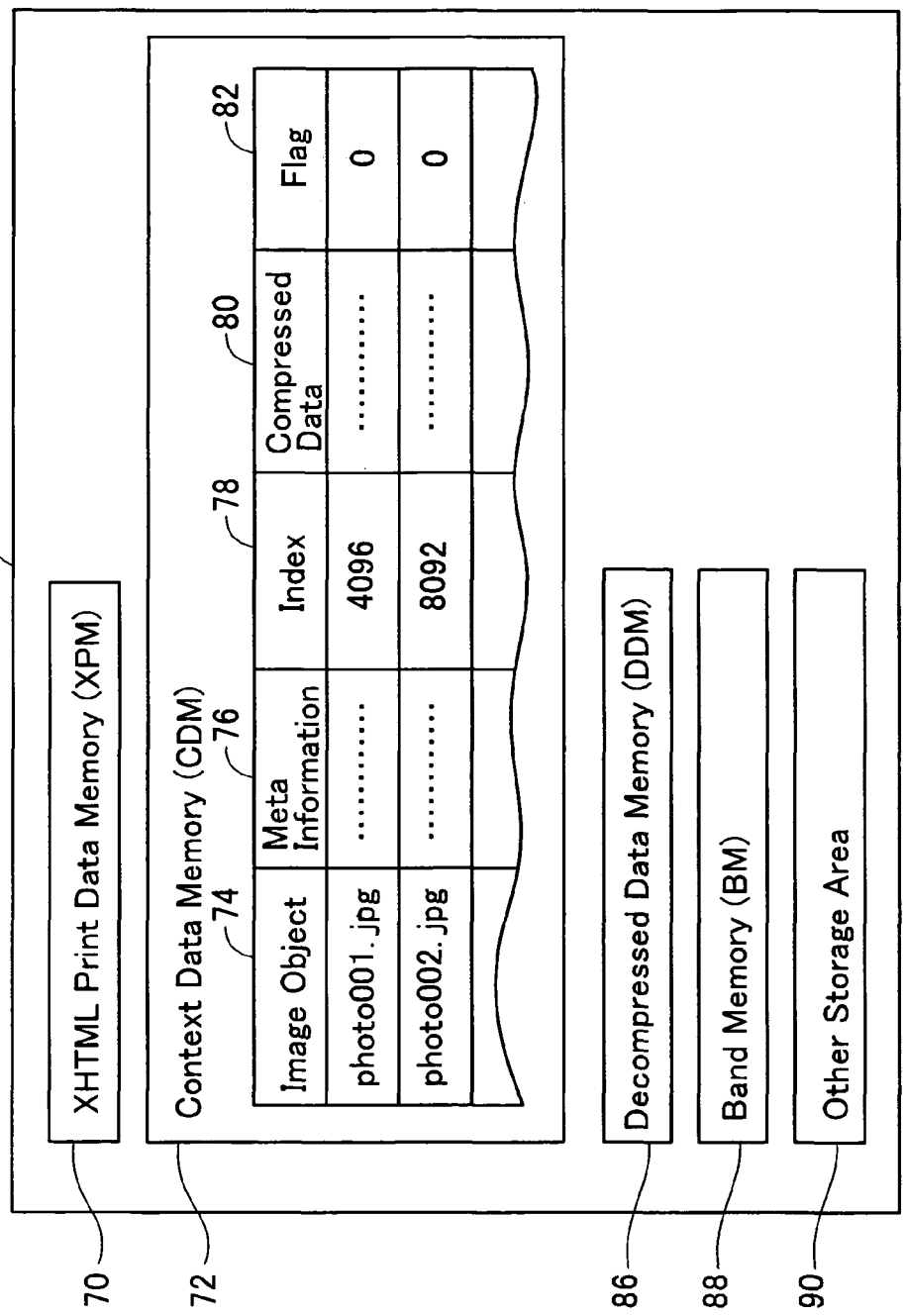
FIG. 4 shows an example of a storage content of a RAM of the multi function device.

FIG. 4 shows an example of the storage content of the RAM 56 of the multi function device 40. The RAM 56 has an XHTML-Print data memory (XPM) 70, context data memory (CDM) 72, decompressed data memory (DDM) 86, band memory (BM) 88, other storage area 90, etc. XPM 70 can store XHTML-Print data that will be transmitted from the PC 10. The content of the XHTML-Print data will be described in detail below. CDM 72 can associate and store the address of an image object (file name) 74, meta information 76, an index 78, compressed data 80, and a received flag 82. The content of each data 74 to 82 will be described in detail below. The DDM 86 can store decompressed data. The BM 88 can store one band of binary data. The storage area 90 can store various data. The content of the data stored by the storage area 90 will be described in detail below as needed.

(Processes Executed By the PC)

As noted above, a user can input the print command by operating the operation device 12 of the PC 10. In this case, the PC 10 will create XHTML-Print data from the data intended for printing (described in detail below). The PC 10 will transmit the XHTML-Print data to the multi-function device 40. The result is that the multi-function device 40 will execute each of the following processes of FIG. 5 to FIG. 7.

(Processes Executed By the Multi-Function Device)

Figure 5:
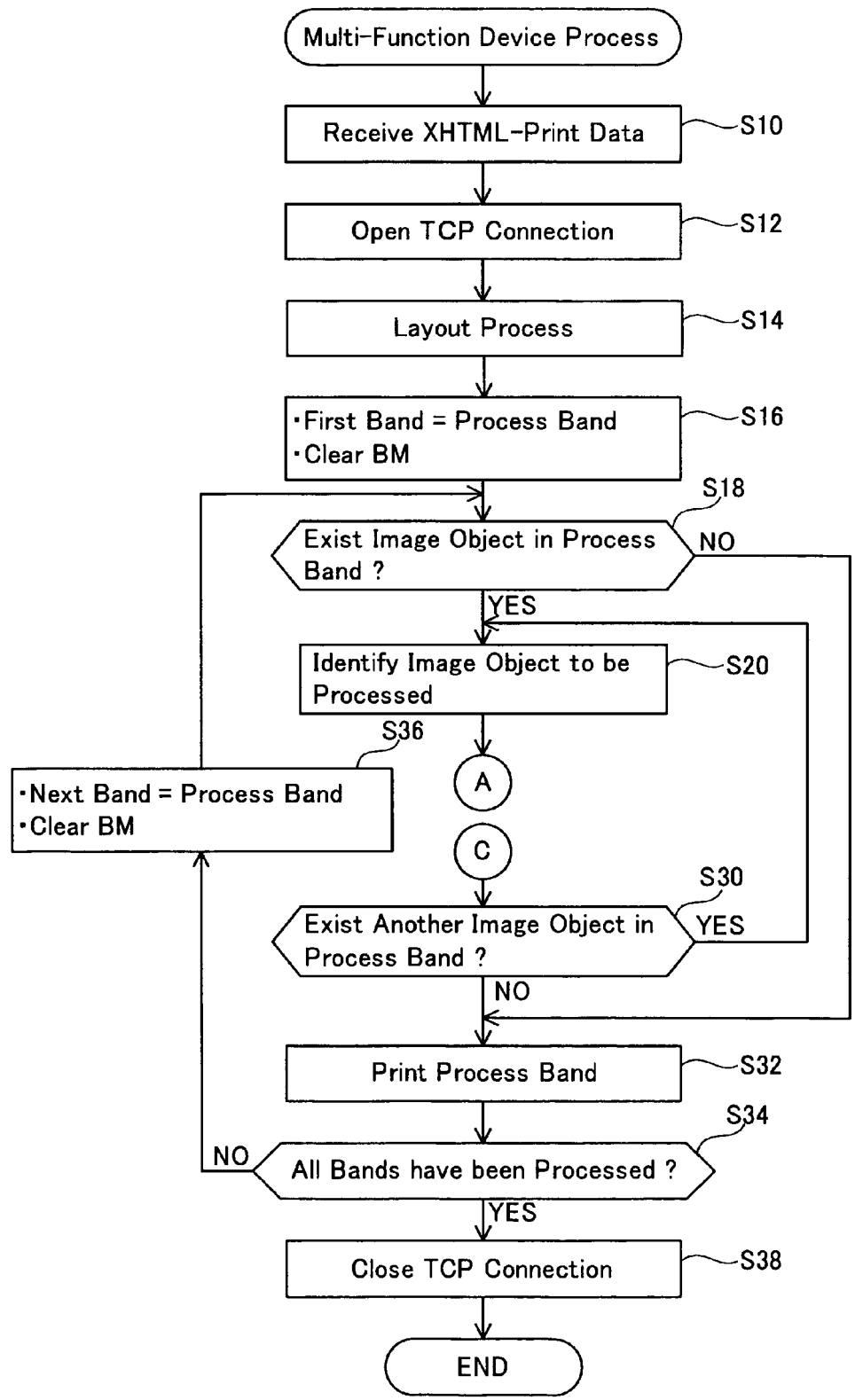
FIG. 5 shows a flowchart of processes executed by the multi function device.
Figure 6:
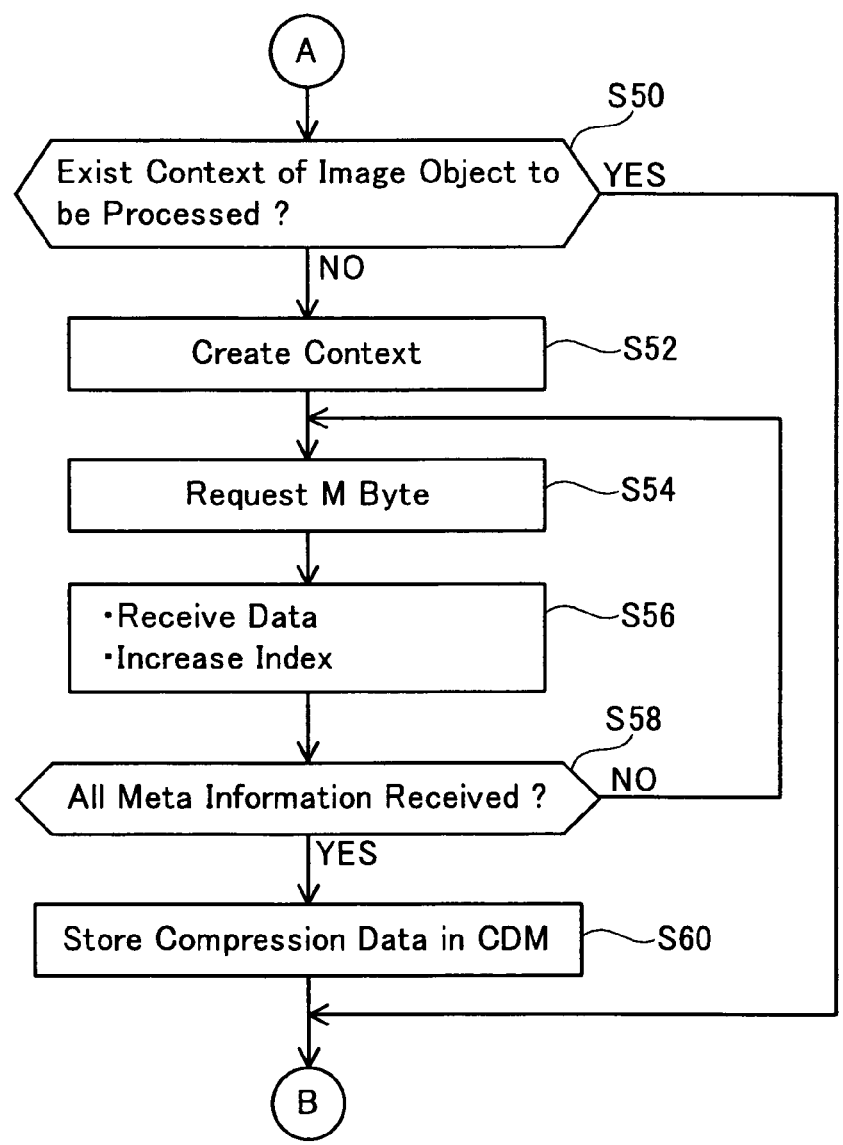
FIG. 6 shows a continuation of the flowchart of FIG. 5.
Figure 7:
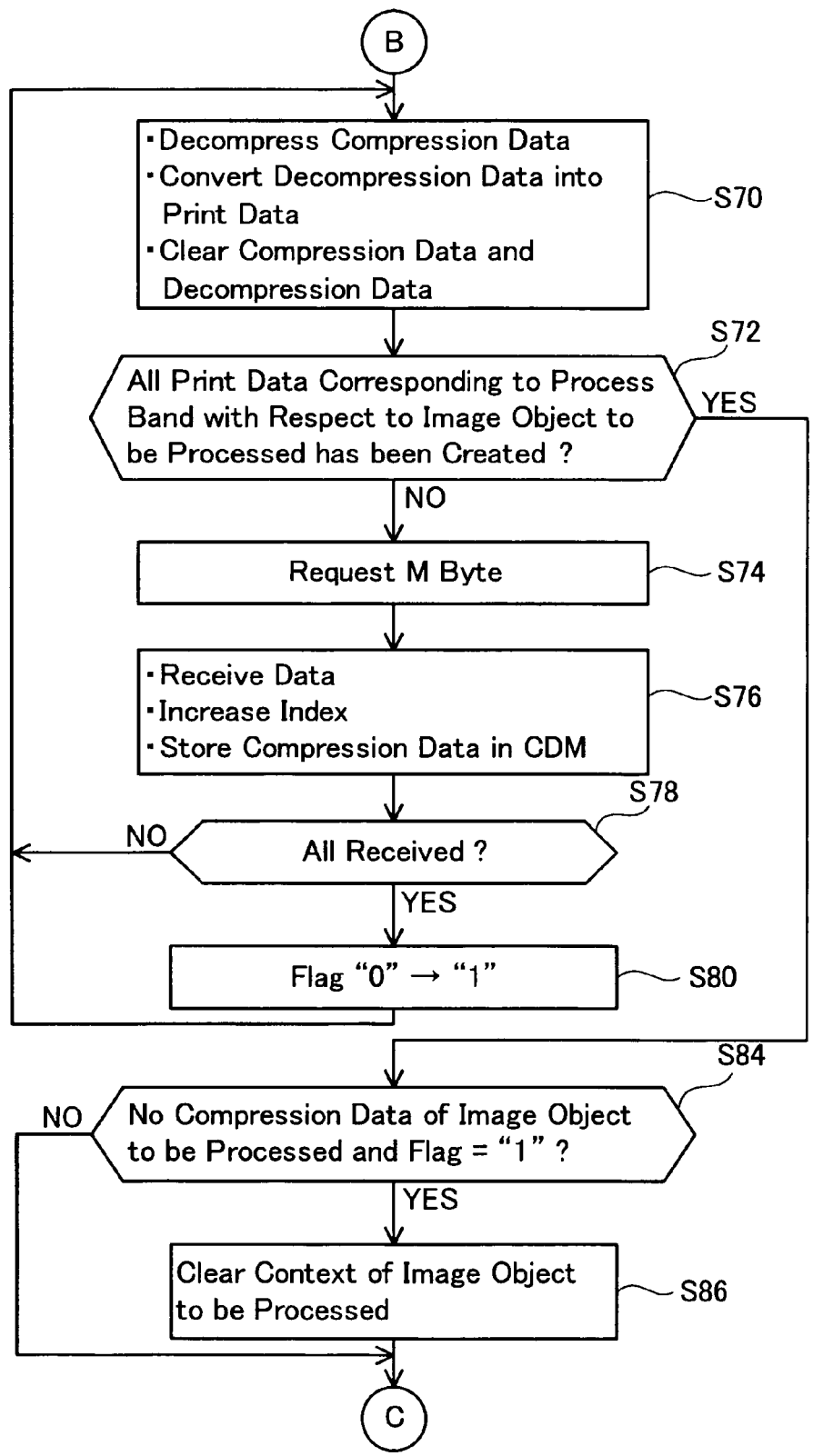
FIG. 7 shows a continuation of the flowchart of FIG. 6.

The processes executed by the multi-function device 40 will be described. These processes will be executed by the CPU 52 of the multi-function device 40. FIGS. 5 to 7 show a flowchart of the processes executed by the multi-function device 40 when the XHTML-Print data is sent from the PC 10.

When the XHTML-Print data is received (S10), the CPU 52 will store the XHTML-Print data in XPM 70 (see FIG. 4). Next, the CPU 52 will establish a TCP connection to the PC 10 (S12). Next, the CPU 52 will execute the layout process based upon the XHTML-Print data stored in XPM 70 (S14). The layout process will be described in detail.

FIGS. 8 to 10 illustrate an example of the XHTML-Print data. As shown in FIG. 8, the XHTML-Print data 300 includes a reference URL 302. The reference URL 302 includes the IP address "192.168.0.100" of the PC 10 and a "photo". The multi-function device 40 will download the compressed data of an image object (an image file; described in detail below) contained at the reference URL 302, decompress this to create decompressed data, and convert the decompressed data to binary data (print data). The XHTML-Print data 300 includes a text string 304 that indicates the rules of the print media, a text string 306 that indicates the area that can be printed, a size 307 of the print medium, and a blank 308. What the blank 308 is and how it is used will be described in detail below.

As shown in FIG. 9, the XHTML-Print data 300 includes a blank 310 (described in detail below). In addition, the XHTML-Print data 300 includes data 315 that indicates the position of the image objects. In the present embodiment, one page will be printed in a state in which eight image objects are arrayed. In other words, eight image objects will be index printed. Because of this, the data 315 includes position data for each of the eight image objects. The position data of each image object includes blanks 320, 322, 324, width 326, and height 328 (described in detail below). In addition, the XHTML-Print data 300 includes class attributes 340 that indicate the positions of the image objects in greater detail. The class attributes 340 indicate the rotation angles of the image objects, more specific blanks, etc.

As shown in FIG. 10, the XHTML-Print data 300 includes data 350 that indicates a file name 352 and class 354 of each image object. For example, the data 350 includes the file name 352 of "photo 001.jpg" and the class 354 of "img__34__0deg". The class 354 corresponds to the class attributes of the reference number 340a of FIG. 9. In other words, the image object corresponding to the data 350a is one which has the file name 352 of "photo 001.jpg", and is set to a rotation angle and specific blank in accordance with the class attributes 340a. In this example, the class attributes of reference number 340a include "image_orientation:0deg". This means that the rotation angle of the image object corresponding to the data 350a is "0". Note that a description of the detailed blank included in the class attributes 340a is omitted.

Figure 11:
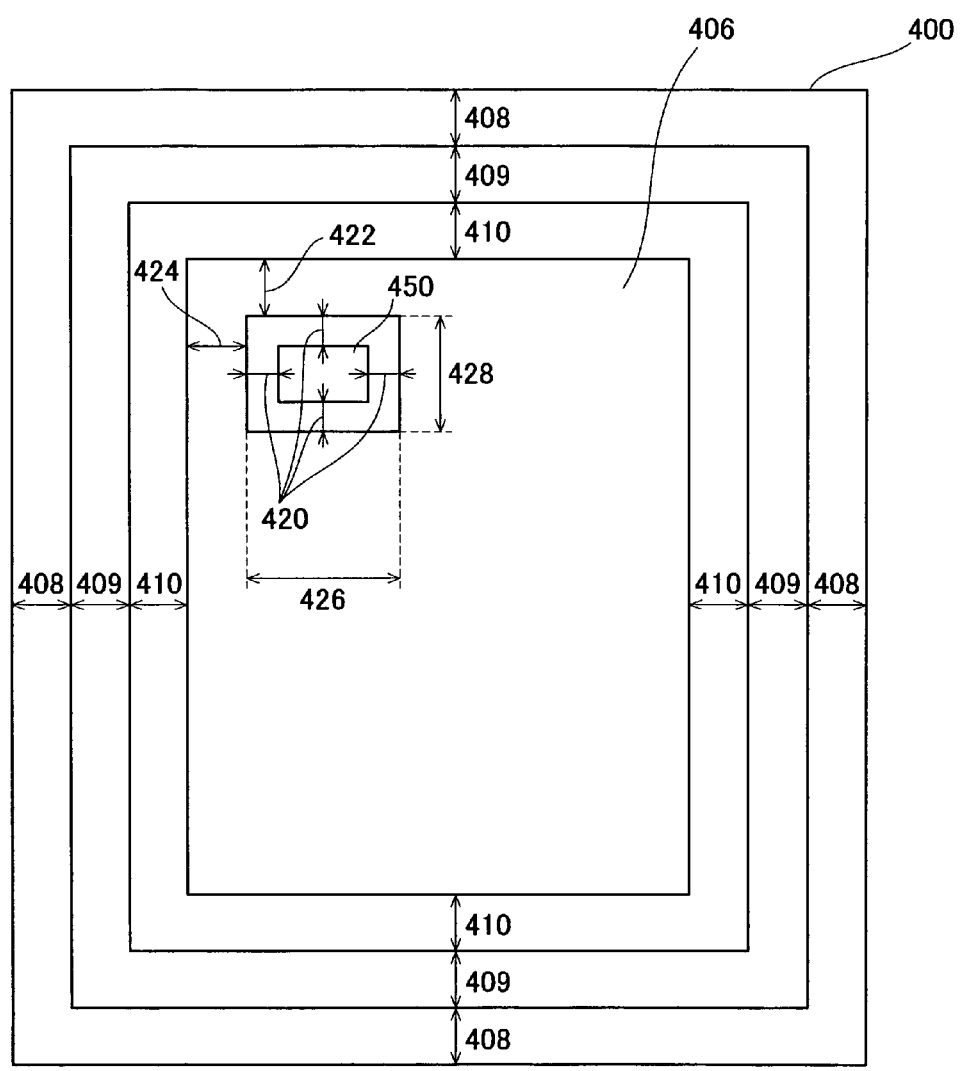
FIG. 11 shows a diagram for describing blanks etc. that are included in XHTML-Print data.

FIG. 11 shows a diagram for describing the meaning of each blank etc. included in the XHTML-Print data 300. Reference number 400 indicates one page of print medium (e.g., printing paper). The size of the print medium 400 is set by the size 307 of FIG. 8. In this example, letter size print medium 400 is used. The blank 408 corresponds to the blank 308 of FIG. 8. In this example, the blank 408 is "0.2" (inch). The blank 409 is a value that is determined in advance by the multi-function device 40. The blank 410 corresponds to the blank 310 of FIG. 9. In this example, the blank 410 is "0". In this way, a page area 406 will be defined. A plurality of image objects will be arranged inside the page area 406.

The blank 422 of the page area 406 corresponds to the blank 322 of FIG. 9. For example, the blank 322 is "0" in the position data 315a of FIG. 9. Because of this, the blank 422 will also be "0". The blank 424 of the page area 406 corresponds to the blank 324 of FIG. 9. For example, the blank 324 is "0.466" (inch) in the position data 315a of FIG. 9. Because of this, the blank 424 will also be "0.466" (inch). The blank 420 of the page area 406 corresponds to the blank 320 of FIG. 9. For example, the blank 320 is "0" in the position data 315a of FIG. 9. Because of this, the blank 420 will also be "0". The width 426 corresponds to the width 326 of FIG. 9. For example, the width 326 is "3.25" (inch) in the position data 315a of FIG. 9. Because of this, the width 426 will also be "3.25" (inch). The height 428 corresponds to the height 328 of FIG. 9. For example, the height 328 is "2.5" (inch) in the position data 315a of FIG. 9. Because of this, the height 428 will also be "2.5" (inch).

Figure 12:
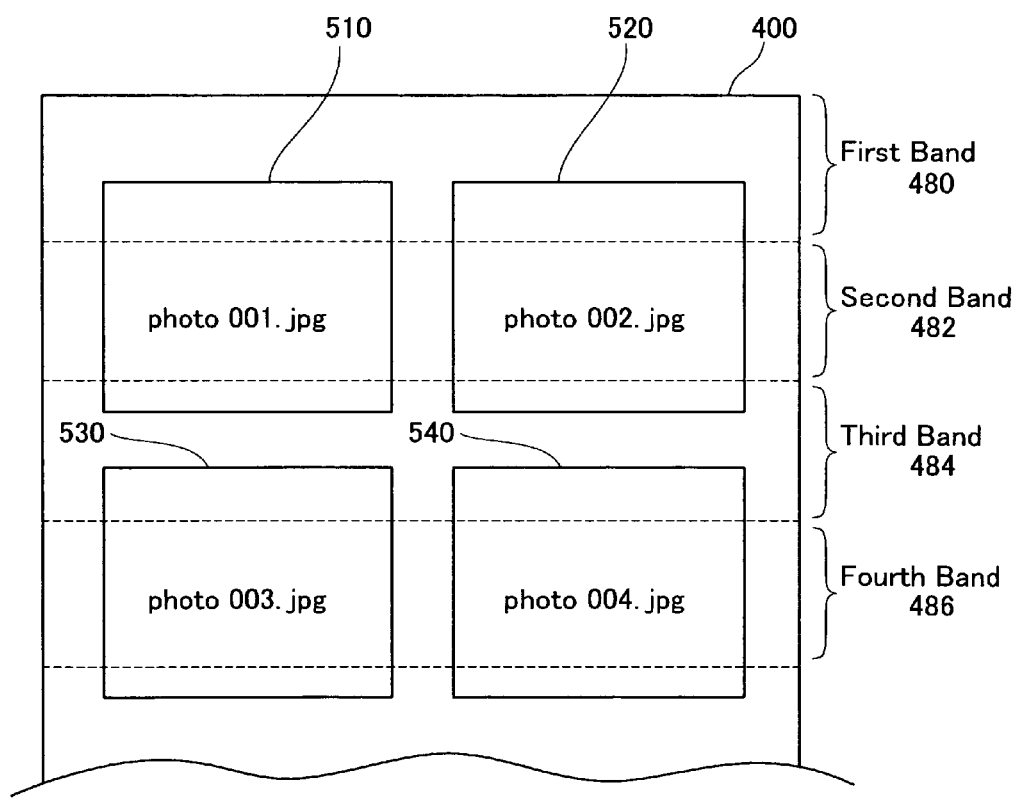
FIG. 12 shows a situation in which a plurality of image objects are laid out on one page of a print medium.

The position of the image objects can be set by referencing each blank, etc. included in the XHTML-Print data 300. In other words, in the example of FIG. 11, one image object will be arranged in the area indicated by reference number 450. As noted above, the XHTML-Print data 300 includes position data 315 (see FIG. 9) for each of the eight image objects. Because of this, the positions of the eight image objects on the print medium 400 of FIG. 11 can be set. In the layout process of S14 of FIG. 5, the CPU 52 will set the positions of the eight image objects from the XHTML-Print data 300. FIG. 12 shows the positions of the image objects 510, 520, 530, 540 on the print medium 400. Note that although there are in fact eight image objects, in FIG. 12, only the upper half of the print medium 400 is shown, and only four image objects 510, 520, 530, 540 are shown.

The CPU 52 will create and print binary data in band units. In other words, the binary data used in printing the one page of print medium 400 will be divided into a plurality of bands 480, 482, 484, 486. Although described in detail below, the CPU 52 will first create and print the binary data of the first band 480. Next, the CPU 52 will create and print the binary data of the second band 482. By repeating this process for the third band 484 and thereafter, all of the binary data corresponding to the one page of print medium 400 will be printed. Note that the band width of one band (the length in the vertical direction of FIG. 12) is the width in which the ink jet head can print in one run. Note also that the band width may be determined by another reference.

Returning to FIG. 5, a description of the processes to be executed by the CPU 52 will continue. The layout data created in the layout process of S14 (the data that indicates the relative positional relationship between the positions of the image objects and the bands) is temporarily stored, for example, in the storage area 90 (see FIG. 4). When the layout process is to be executed, the CPU 52 will define the first band 480 as process band. In addition, in S16, the CPU 52 will clear BM 88 (see FIG. 4). Next, the CPU 52 will determine whether or not an image object is included in the process band (S18). For example, in the example of FIG. 12, image objects 510, 520 are included in the first band 480. In this case, the CPU 52 will determine that the answer is YES in S18. When the answer is YES in S18, the CPU 52 will specify the image object to be processed (S20). For example, when there are two image objects 510, 520 like shown in FIG. 12, one of the objects will be specified (in the present specification, this is assumed to be the image object 510). The process will proceed to S50 of FIG. 6 when S20 is completed.

In S50, the CPU 52 will determine whether or not there is context data present for the image object to be processed. The CDM 72 of FIG. 4 can store context data for each image object. By checking the storage content of the CDM 72, the CPU 52 will determine whether or not the context data of the image object to be processed has already been created. For example, when the first band 480 of FIG. 12 is the process band, the context data of the image object will still not be in existence. In this case, it will be determined that the answer is NO in S50.

In the event the answer is NO in S50, the CPU 52 will create context data for the image object 510 to be processed, and store this in CDM 72 (S52). First, the CPU 52 will store the file name "photo 001.jpg" of the image object 510 in CDM 72. In this case, nothing is stored in the meta information 76, index 78, and compressed data 80. In addition, the received flag 82 is "0".

Next, the CPU 52 will transmit a request to the PC 10 to only reply with a predetermined number of bytes (assumed to be "4000 bytes" in the present embodiment) of the image object 510 to be processed (a JPEG file in the present embodiment) (S54). More specifically, an HTTP request that includes the file name "photo 001.jpg" of the image object 510 will be transmitted. The HTTP request contains a text string that requests a 4000 byte portion (a range of 0 to 3999 bytes). The result is that the PC 10 will transmit 4000 bytes included in the JPEG file of "photo 001.jpg" to the multi-function device 40 (HTTP response). Note that the multi-function device 40 of the present embodiment will perform data communication with the PC 10 via a single connection. In other words, the CPU 52 will not simultaneously transmit a plurality of HTTP requests. The CPU 52 will transmit one HTTP request, and if it receives an HTTP response corresponding thereto, it will transmit the next HTTP request.

Figure 13:
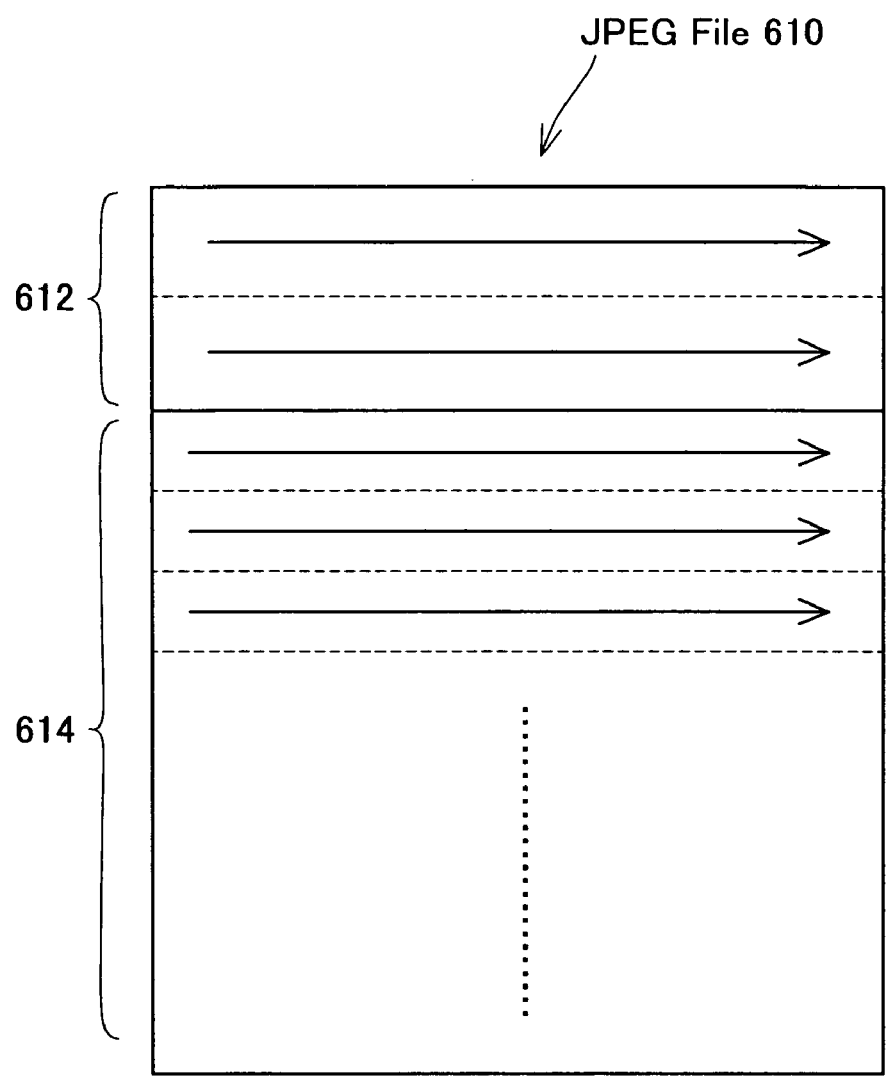
FIG. 13 shows a simplified data structure of a JPEG file.

Here, the data structure of the JPEG file will be described. FIG. 13 shows the simplified data structure of a JPEG file. A JPEG file 610 includes meta information 612 and compressed data 614. The meta information 612 includes parameters related to images (resolution, etc.) and parameters needed for decompressing the compressed data 614 (Huffman table, etc.). The compressed data 614 is an item in which the JPEG image data of an image object (decompressed data described below) has been compressed. With the JPEG file 610, the meta information 612 is the first portion thereof, and the compressed data 614 follows thereafter. Thus, when the multi-function device 40 requests the PC 10 to transmit data from the beginning thereof, the PC 10 will first reply with the meta information 612.

For example, when the process of S54 of FIG. 6 is set to begin with respect to the image object 510, the CPU 52 will transmit an HTTP request that requests a reply in a range from the first to the 3999th byte of the image object 510. FIG. 14 shows an example of an HTTP request 700. The HTTP request 700 includes the file name 701 of the image object 510. In addition, the HTTP request 700 includes a text string 702 that indicates the data range. For example, when requesting a transmission in a range from the first to the 3999th byte, the integer "0-3999" will be inserted in the text string 702. This will result in the PC 10 replying to the multi-function device 40 with an HTTP response that includes data from the first to the 3999th byte.

Figure 15:
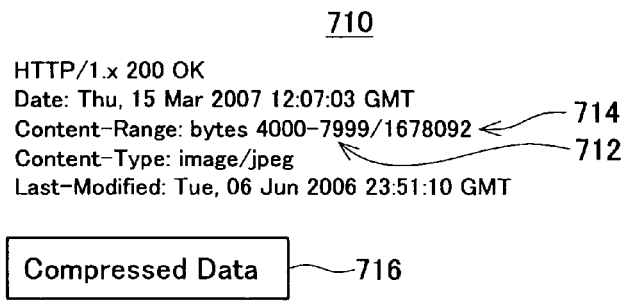
FIG. 15 shows an example of an HTTP response.

FIG. 15 shows an example of an HTTP response. The HTTP response 710 includes a text string 712 that indicates what range of data has been provided, and a text string 714 that indicates the total data size of the JPEG file 600. The HTTP response 710 may include the meta information (see reference number 612 of FIG. 13) and/or compressed data (see reference number 614 of FIG. 13). The data included in the HTTP response 710 will change in accordance with the content of the HTTP request 700. For example, when the meta information is the first to 6000th bytes of the JPEG file 600, and an HTTP request 700 is received which requests a reply containing the first to 3999th bytes thereof, the HTTP response 710 will include only the meta information. In addition, when an HTTP request 700 is received that requests the 4000th to 7999th bytes in the aforementioned example, the HTTP response 710 will include both the meta information and the compressed data. In addition, when an HTTP request 700 is received that requests the 8000th to 11999th bytes in the aforementioned example, the HTTP response 710 will include the compressed data only. Note that in FIG. 15, the compressed data 716 included in the HTTP response 710 is illustrated.

When the process of S54 shown in FIG. 6 is performed, a 4000 byte portion of data will be received by the multi function device 40 (S56). The CPU 52 will increase the index 78 of the CDM 72 (see FIG. 4). For example, when the data range that was received is from the first to the 3999th bytes of the image object 510 (photo 001.jpg), the index 78 of the context data corresponding to that image object 510 will be increased to "3999". Note that when the meta information was received in S56 (see FIG. 13), the CPU 52 will store that meta information 612 in the CDM 72. In this way, the CPU 52 can use the meta information 612 stored in CDM 72, and decompress the compressed data in a later step (S70 of FIG. 7).

Next, the CPU 52 will determine whether or not all meta information was received (S58). For example, data may be included in the meta information 612 (see FIG. 13) that can calculate the total data size of the meta information itself. The CPU 52 can calculate the total data size of the meta information 612, and determine from the index 78 whether or not that total data size was received. In the event the answer is NO in S58, the CPU 52 will return to S54 and execute an HTTP request. This HTTP request includes a text string 702 (see FIG. 14) that requests the transmission of a 4000 byte portion (4000 to 7999) following the value stored in the index 78 (e.g., 3999).

In the event that the answer is YES in S58, all meta information 610 will have been received. For example, when the meta information 612 of the JPEG file 610 is 6000 bytes, the first to 3999th bytes of the meta information 612 will be received at the first S56, and then the 4000 to 6000th bytes of the meta information 612 will be received in the next S56 (in other words, all of the meta information). In this case, compressed data 614 from the 6001 to 7999th bytes will also be received. In this case, the process of S60 will be executed. In S60, the CPU 52 will store the compressed data in CDM 72 (see FIG. 4). For example, when the compressed data of the image object 510 (photo 001.jpg) was received, the file name of that image object 510 will be associated therewith and the compressed data 80 will be stored. The CPU 52 will proceed to S70 of FIG. 7 when S60 is complete.

In S70, the CPU 52 will create decompressed data by decompressing the compressed data stored in CDM 72 in S60. This decompressed data will be temporarily stored in DDM 86 (see FIG. 4). Furthermore, the CPU 52 will convert the decompressed data stored in DDM 86 to binary data, and write that binary data to BM 88 (see FIG. 4). The decompressed data is 256 color RGB bit map data. The binary data is bit map data in which the decompressed data was binarized. The print device 46 (see FIG. 3) can create dots on the print medium 400 in accordance with that binary data in a later step (S32 of FIG. 5). Note that binary data will sometimes be referred to below as "print data". When the CPU 52 creates the decompressed data and the binary data, it will clear the compressed data stored in CDM 72, and clear the decompressed data stored in DDM 86.

Figure 1:
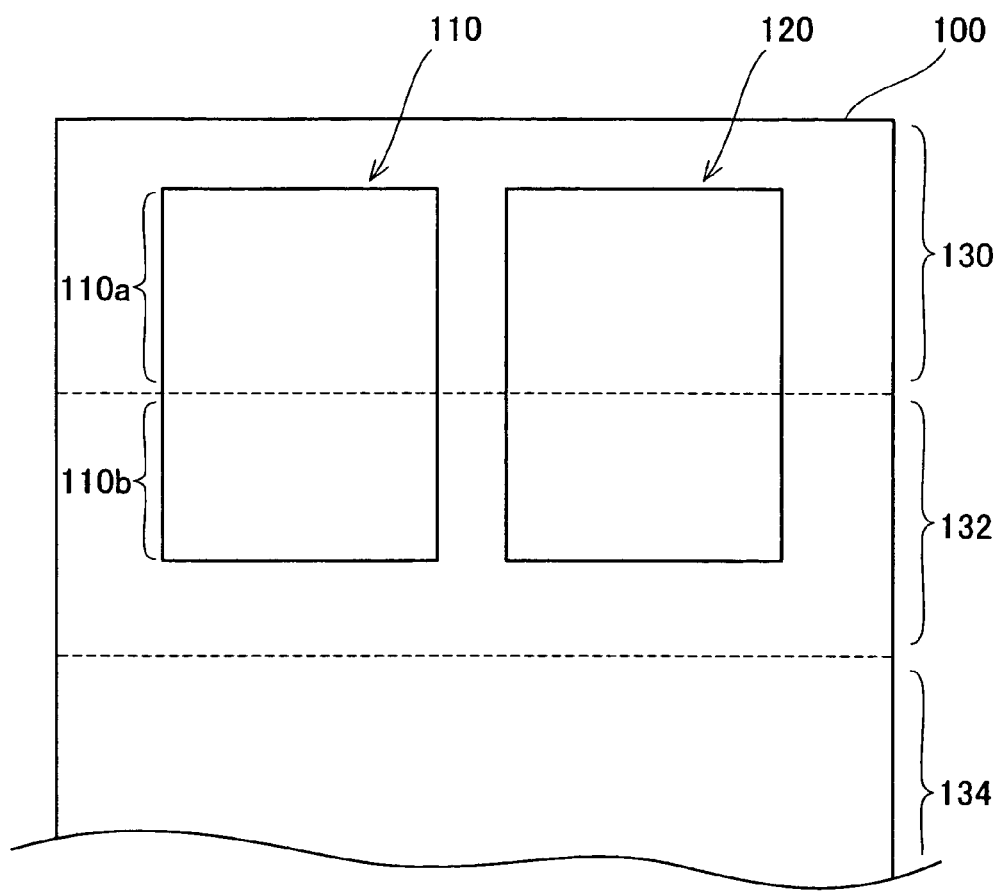
FIG. 1 shows a diagram for describing a situation in which print data is created in band units.
Figure 2:
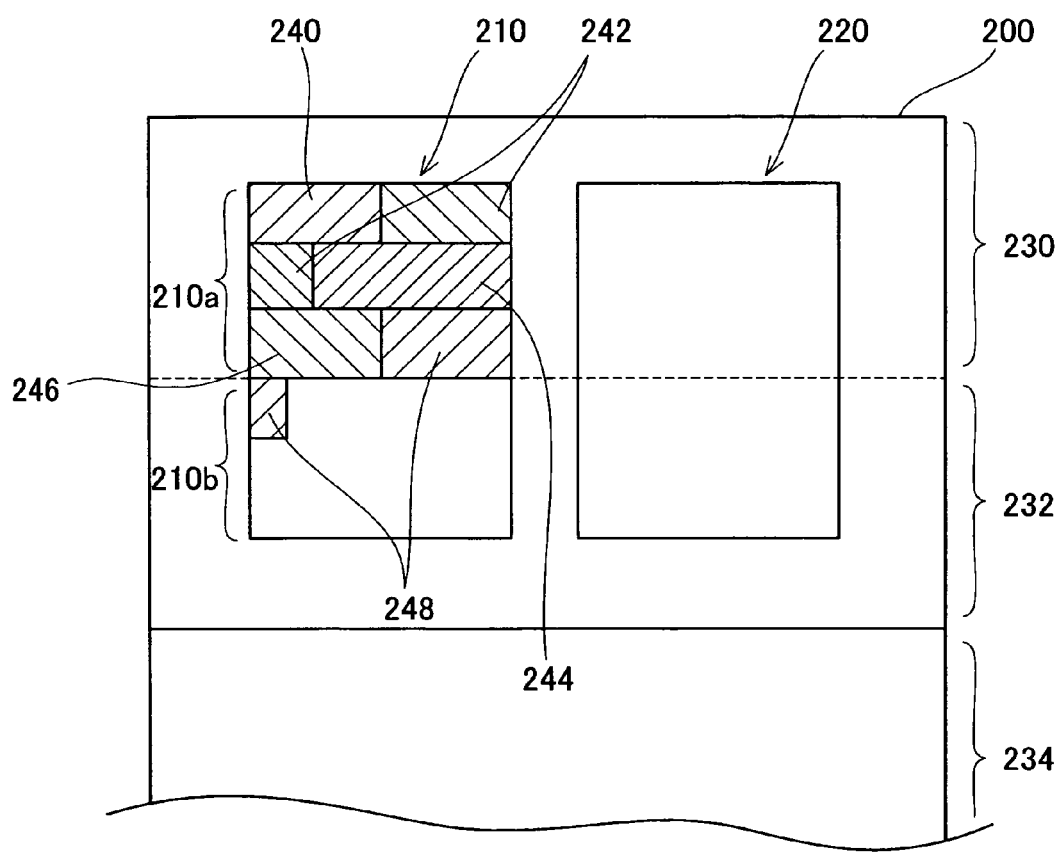
FIG. 2 shows a diagram for describing one method disclosed in the present specification.
Figure 16:
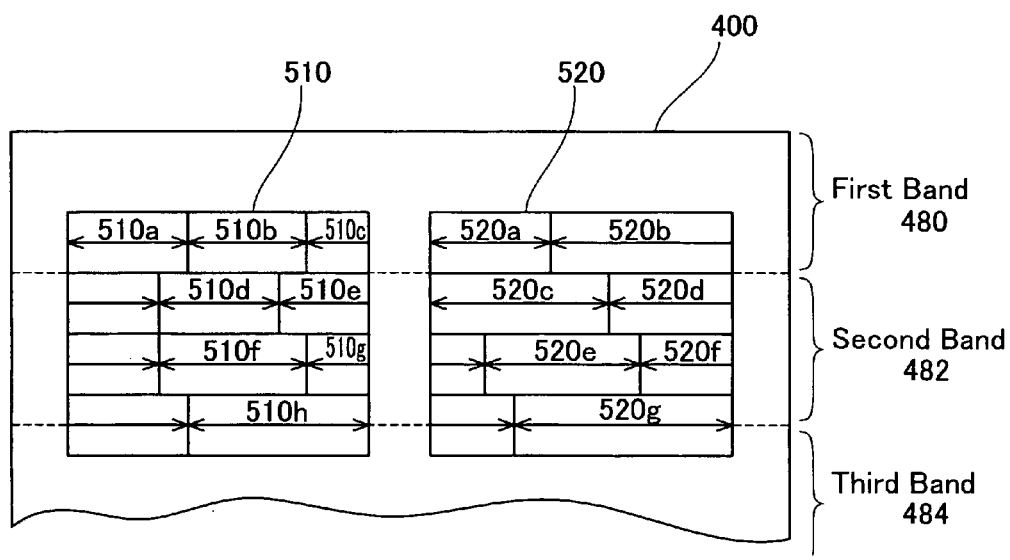
FIG. 16 shows a diagram for describing a situation in which image objects are downloaded little by little.

FIG. 16 shows a diagram for describing a situation in which the decompressed data of two image objects 510, 520 are to be created. By executing the process of S70 noted above, decompressed data (and binary data) corresponding to the portion 510*a* of the image object 510 will be created. The CPU 52 will determine whether or not all decompressed data (in other words, binary data) corresponding to the process band (first band 480) of the image object 510 to be processed has been created (S72). For example, at the stage at which decompressed data corresponding to the portion 510*a* of FIG. 1 was created, decompressed data of the portions 510*b*, 510*c* included in the first band 480 have not yet been created. In this case, the CPU 52 will determine that the answer is NO in S72.

In the event the answer is NO in S72, the CPU 52 will transmit an HTTP request to the PC 10 (S74). This HTTP request includes a text string 702 (see FIG. 14) that requests the transmission of the 4000 byte portion (8000 to 11999) following the value stored in the index 78 (e.g., 7999). In other words, the CPU 52 will request the compressed data that follows the compressed data received in S56 of FIG. 6. This will result in 4000 bytes of compressed data being received by the multi-function device 40 (S76). Furthermore, the CPU 52 will increase the index 78 of CDM 72 (see FIG. 4), and store the compressed data in CDM 72. Next, the CPU 52 will determine whether or not all compressed data that makes up the image object 510 was received (S78). In S78, when there is a 4000 byte response as a result of transmitting the request for a 4000 byte portion, it will be determined that the answer is NO. In contrast, when there is a less than 4000 byte response as a result of transmitting the request for a 4000 byte portion, it will be determined that the answer is YES.

In the event the answer is NO in S78, the CPU 52 will return to S70, decompress the compressed data, create decompressed data, and then convert the decompressed data into binary data (print data). In this way, the decompressed data of the portion 510*b* of FIG. 16 will be created, and the binary data of the portion 510*b* will be written into BM 88. In this state, it will again be determined that the answer is NO in S72. This will result in the CPU 52 repeating the processes S74, S76, S70. In this way, the decompressed data of the portion 510*c* of FIG. 16 will be created, and the binary data of the portion 510*c* will be written into BM 88. Note that the portion 510*c* will also extend across the second band 482. In this case, the CPU 52 will only write the binary data included in the first band 480 into BM 88. In addition, in the process of S70, the CPU 52 will clear from CDM 72 only the compressed data that was needed for creating the decompressed data corresponding to the first band 480. In other words, the compressed data needed to create the decompressed data corresponding to the second band 482 will be still stored in CDM 72. This compressed data will be used when creating decompressed data corresponding to the second band 482.

When binary data corresponding to the portions 510*a*, 510*b*, 510*c* of FIG. 16 is created, it will be determined that the answer is YES in S72. In this case, CPU 52 will proceed to S84 in FIG. 7. In S84, the CPU 52 will determine whether or not compressed data of the image object 510 to be processed is in CDM 72, and whether the received flag 82 (see FIG. 4) is "1". The received flag 82 will be "1" in the event the answer is YES in S78. In other words, when all of the compressed data of the image object 510 has been received, the received flag 82 corresponding to the image object 510 will be "1". At the stage at which the binary data corresponding to the portions 510*a*, 510*b*, 510*c* of FIG. 16 has been created, all of the compressed data of the image object 510 will not have been received. Because of this, it will be determined that the answer is NO in S84. In this case, the CPU 52 will skip S86 and proceed to S30 of FIG. 5. In contrast, in the event the answer is YES is S84, the CPU 52 will clear from CDM 72 the context data corresponding to the image object (e.g., 510) to be processed (S86).

In S30 of FIG. 5, the CPU 52 will determine whether or not there is an unprocessed image object in the process band (the first band 480). In other words, the CPU 54 will determine whether or not there is an image object included in the first band 480, and whether or not binary data corresponding to the first band 480 has not yet been created. For example, when the process of S30 is to be executed at the stage in which the binary data of the image object 510 (the binary data of reference numbers 510*a*, 510*b*, 510*c* of FIG. 16) has been created, binary data for the image object 520 has yet to be created. In this case, it will be determined that the answer is YES in S30, and CPU 52 will return to S20. In S20, the image object 520 will be identified as the image object to be processed. The CPU 52 will execute each process of FIG. 6 and FIG. 7 with respect to the image object 520. This will result in the creation of decompressed data (and binary data) corresponding to the portion 520*a* and portion 520*b* shown in FIG. 16. In this case, it will be determined that the answer is NO in S30, and CPU 52 will return to S32.

In S32, the CPU 52 will execute a print process for the first band 480. The CPU 52 will command the print device 46 to print in accordance with the binary data (print data) stored in BM 88 (see FIG. 4). In this way, the print device 46 will print the first band 480. Next, the CPU 52 will determine whether or not all bands have been printed (S34). For example, at the stage at which the first band 480 was printed, printing will not be performed for the second band 482 and thereafter. In this case, it will be determined that the answer is NO in S34. The CPU 52 will identify the following second band 482 as the process band (S36). In addition, the CPU 52 will clear BM 88 (see FIG. 4). In other words, the CPU 52 will clear the binary data for the first band 480.

When S36 is completed, the CPU 52 will execute the processes of S18 and thereafter with respect to the second band 482. This will result in the creation of decompressed data (and binary data) for some of the portion 510*c* (the portion corresponding to the second band 482), the portion 510*d*, the portion 510*e*, the portion 510*f*, the portion 510*g*, and the portion 510*h* shown in FIG. 16. Next, decompressed data (and binary data) for the portion 520*c*, the portion 520*d*, the portion 520*e*, the portion 520*f*, and the portion 520*g* shown in FIG. 16 will be created. In this way, the binary data for the second band 482 will be completed, and the print process for the second band 482 will be executed (S32 of FIG. 5). The CPU 52 will execute the print process in the same way with the third band 484 and thereafter. In this way, the print medium 400 in which eight image objects 510, 520, etc. have been printed on one page will be obtained. When the printing of all bands has been completed, the CPU 52 will determine that the answer is YES in S34 of FIG. 5. In this case, the CPU 52 will cut the connection (S38) and processing will be complete.

According to the aforementioned embodiment, the compressed data of the image object 510 will be downloaded little by little (will be downloaded in 4000 byte units), and the decompressed data (and binary data) will be created. Each time the decompressed data is created, it will be determined whether or not all of the decompressed data corresponding to the first band 480 of the image object 510 has been created. If a positive determination occurs here, the downloading of the image object 510 will stop, and the downloading of the image object 520 will begin. The result is that only the decompressed data needed to create binary data for the first band 480 (the decompressed data corresponding to the portions 510*a* to 510*c*) will be created. In other words, not all of the decompressed data corresponding to the second band 482 and the third band 484 of the image object 510 will be created. Because of this, the storage capacity for storing the decompressed data (in the present embodiment, the storage capacity of DDM 86) is extremely small. According to the present embodiment, decompressed data can be efficiently created, without putting stress on the memory capacity, in situations in which compressed data for a plurality of image objects 510, 520, etc. is to be downloaded with a single connection and decompressed data is to be created.

Although embodiments have been described in detail above, these are merely illustrations. Various modifications and changes can be made to the aforementioned embodiment. For example, the multi-function device 40 of the aforementioned embodiment will download compressed data for an image object from the PC 10 and create print data. However, the multi-function device 40 may download an image object from a digital camera, a memory card, a server on the Internet, or another external device, and create print data.

What is claimed is:

1. A method of creating decompressed data in order to create print data by downloading compressed data of a plurality of image objects from an external device via a network utilizing a single connection, and by decompressing the downloaded compressed data, the method comprising:

a first downloading step of downloading a predetermined size of first compressed data of a first image object from the external device via the network in order to create the print data to be utilized for printing the first image object and a second image object which is different from the first image object on one print medium, wherein the first image object is to be included in both a first band of the print data and a second band of the print data which is next to the first band, a first part of the first image object is to be included in the first band, a second part of the first image object is to be included in the second band, and the second image object is to be included in the first band;

a first decompression step of creating first decompressed data by decompressing the first compressed data having the predetermined size downloaded in the first downloading step;

a determination step of determining whether all the first decompressed data corresponding to the first part of the first image object to be included in the first band has been created;

a repeating step of repeating the first downloading step, the first decompression step, and the determination step in a case where a negative determination is obtained in the determination step;

a second downloading step of downloading second compressed data of the second image object from the external device via the network before downloading each first compressed data which has not been downloaded yet corresponding to the second part of the first image object to be included in the second band in a case where a positive determination is obtained in the determination step; and a second decompression step of creating second decompressed data by decompressing the second compressed data downloaded in the second downloading step.

2. The method as in claim 1, further comprising:

a data size storage step of storing a total data size of the first compressed data downloaded in each first downloading step, wherein each first downloading step includes requesting the external device to send the predetermined size of the first compressed data following the value of the total data size stored in the data size storage step.

3. A method of creating print data of the first band by converting the first decompressed data and the second decompressed data created in the method as in claim 1.

4. A non-transitory computer readable medium storing a computer program for creating decompressed data in order to create print data by downloading compressed data of a plurality of image objects from an external device via a network utilizing a single connection, and by decompressing the downloaded compressed data, the computer program including instructions for ordering a computer to perform:

a first downloading step of downloading a predetermined size of first compressed data of a first image object from the external device via the network in order to create the print data to be utilized for printing the first image object and a second image object which is different from the first image object on one print medium, wherein the first image object is to be included in both a first band of the print data and a second band of the print data which is next to the first band, a first part of the first image object is to be included in the first band, a second part of the first image object is to be included in the second band, and the second image object is to be included in the first band;

a first decompression step of creating first decompressed data by decompressing the first compressed data having the predetermined size downloaded in the first downloading step;

a determination step of determining whether all the first decompressed data corresponding to the first part of the first image object to be included in the first band has been created;

a repeating step of repeating the first downloading step, the first decompression step, and the determination step in a case where a negative determination is obtained in the determination step;

a second downloading step of downloading second compressed data of the second image object from the external device via the network before downloading each first compressed data which has not been downloaded yet corresponding to the second part of the first image object to be included in the second band in a case where a positive determination is obtained in the determination step; and a second decompression step of creating second decompressed data by decompressing the second compressed data downloaded in the second downloading step.

5. A device for creating decompressed data in order to create print data by downloading compressed data of a plurality of image objects from an external device via a network utilizing a single connection, and by decompressing the downloaded compressed data, the device comprising:

a first downloading device that downloads a predetermined size of first compressed data of a first image object from the external device via the network in order to create the print data to be utilized for printing the first image object and a second image object which is different from the first image object on one print medium, wherein the first image object is to be included in both a first band of the print data and a second band of the print data which is next to the first band, a first part of the first image object is to be included in the first band, a second part of the first image object is to be included in the second band, and the second image object is to be included in the first band;

a first decompression device that creates first decompressed data by decompressing the first compressed data having the predetermined size downloaded by the first downloading device;

a determination device that determines whether all the first decompressed data corresponding to the first part of the first image object to be included in the first band has been created;

a second downloading device that downloads second compressed data of the second image object from the external device via the network before downloading each first compressed data which has not been downloaded yet corresponding to the second part of the first image object to be included in the second band in a case where a positive determination is obtained by the determination device; and a second decompression device that creates second decompressed data by decompressing the second compressed data downloaded by the second downloading device.

6. A method of downloading data of a plurality of image objects from an external device via a network utilizing a single connection in order to create print data, the method comprising:

a first downloading step of downloading a predetermined size of first data of a first image object from the external device via the network in order to create the print data to be utilized for printing the first image object and a second image object which is different from the first image object on one print medium, wherein the first image object is to be included in both a first band of the print data and a second band of the print data which is next to the first band, a first part of the first image object is to be included in the first band, a second part of the first image object is to be included in the second band, and the second image object is to be included in the first band;

a determination step of determining whether all the first data corresponding to the first part of the first image object to be included in the first band has been downloaded;

a repeating step of repeating the first downloading step and the determination step in a case where a negative determination is obtained in the determination step; and a second downloading step of downloading second data of the second image object from the external device via the network before downloading each first data which has not been downloaded yet corresponding to the second part of the first image object to be included in the second band in a case where a positive determination is obtained in the determination step.

* * * * *